United States Patent [19]

Bourquin et al.

[11] 3,862,156

[45] Jan. 21, 1975

[54] 4H-BENZO[4,5]CYCLOHEPTA[1,2-6]THIOPHENES

[75] Inventors: Jean-Pierre Bourquin, Magden; Gustav Schwarb, Allschwil; Erwin Waldvogel, Aesch, all of Switzerland

[73] Assignee: Sandoz Ltd., a/k/a Sandoz AG, Basel, Switzerland

[22] Filed: Sept. 5, 1972

[21] Appl. No.: 286,281

[30] Foreign Application Priority Data
Jan. 24, 1972 Switzerland............................ 986/72
Jan. 24, 1972 Switzerland............................ 988/72
Jan. 24, 1972 Switzerland............................ 990/72
Jan. 24, 1972 Switzerland............................ 992/72

[52] U.S. Cl............................. 260/293.57, 424/267
[51] Int. Cl............................................ C07d 63/18

[58] Field of Search.................. 260/293.57, 293.62

[56] References Cited
UNITED STATES PATENTS

| | | | |
|---|---|---|---|
| 3,272,826 | 9/1966 | Jucker et al. .................... | 260/293.4 |
| 3,466,291 | 9/1969 | Jucker et al. .................... | 260/293.4 |
| 3,491,103 | 1/1970 | Jucker et al. .................... | 260/293.4 |
| 3,654,286 | 4/1972 | Bastian et al. ................. | 260/293.57 |
| 3,682,930 | 8/1972 | Bourquin et al. ............... | 260/293.57 |

*Primary Examiner*—G. Thomas Todd
*Attorney, Agent, or Firm*—Gerald D. Sharkin; Robert S. Honor; Thomas O. McGovern

[57] ABSTRACT

The present invention concerns new benzocycloheptathiophene derivatives possessing specific histaminolytic or antaminic properties.

16 Claims, No Drawings

4H-BENZO[4,5]CYCLOHEPTA[1,2-6]THIOPHENES

IMPROVEMENTS IN OR RELATING TO ORGANIC COMPOUNDS

This invention relates to heterocyclic compounds and more specifically to benzocycloheptathiophene derivatives.

In accordance with the invention, there are provided new compounds of formula I,

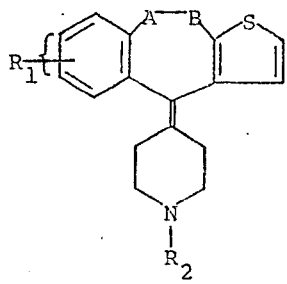

I wherein
$R_1$ is hydrogen, chlorine, bromine or alkoxy of 1 to 4 carbon atoms and is in the 6 or 7 position of the benzocycloheptathiophene nucleus;
$R_2$ is alkyl of 1 to 4 carbon atoms; benzyl; fluoro, chloro or bromo substituted benzyl; diphenylmethyl; or fluoro, chloro or bromo substituted diphenylmethyl; and either one of
A and B is hydroxymethylene or hydroxyiminomethylene and the other is methylene; or, each of
A and B is carbonyl; or, when $R_2$ is benzyl; fluoro, chloro or bromo substituted benzyl; diphenylmethyl; or fluoro, chloro or bromo substituted diphenylmethyl; then one of
A and B is carbonyl and the other is methylene.

It is to be understood that reference to substituted benzyl or substituted diphenylmethyl is intended to be limited to substitution only on the phenyl ring or rings thereof.

Further, the invention provides a process for producing a compound of formula I, which comprises
a. reducing a compound of formula II,

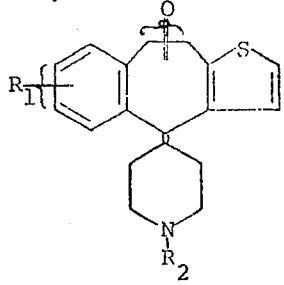

II wherein $R_1$ and $R_2$ are defined above, and the oxo group is in the 9 or 10 position of the benzocycloheptathiophene nucleus,
to produce a compound of formula Ia,

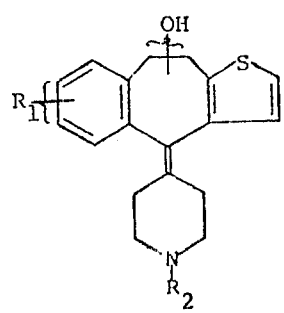

Ia wherein $R_1$ and $R_2$ are as defined above, and the hydroxy group is in the 9 or 10 position of the benzocycloheptathiophene nucleus,
b. reacting a compound of formula II with hydroxylamine, to produce a compound of formula Ib,

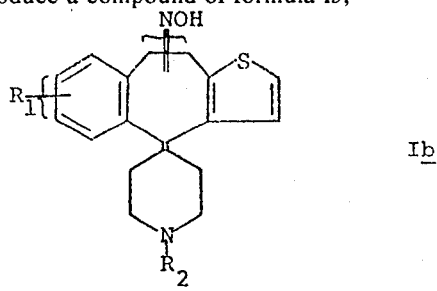

Ib wherein $R_1$ and $R_2$ are as defined above, and the hydroxyimino group is in the 9 or 10 position of the benzocycloheptathiophene nucleus,
c. oxidizing a compound of formula II to produce a compound of formula Ic,

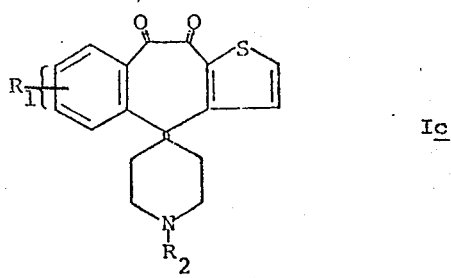

Ic wherein $R_1$ and $R_2$ are as defined above, or
d. reacting a compound of formula III,

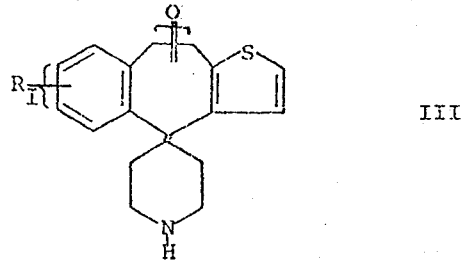

III wherein $R_1$ is as defined above, and the oxo group is in the 9 or 10 position of the benzocycloheptathiophene nucleus,
with a compound of formula IV,

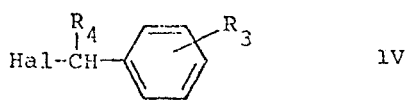

IV wherein
$R_3$ is hydrogen, fluorine, chlorine or bromine,
$R_4$ is hydrogen, phenyl, or fluoro, chloro, or bromo substituted phenyl, and
Hal is chlorine or bromine,
to produce a compond of formula Id,

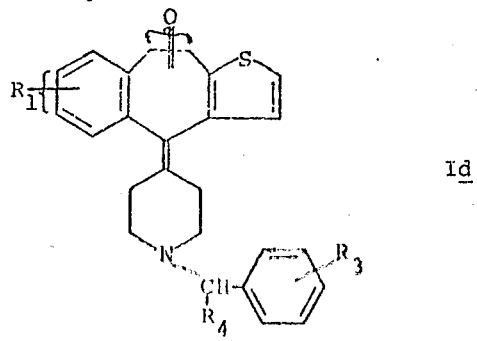

Id wherein $R_1$, $R_3$ and $R_4$ are as defined above, and the oxo group is in the 9 or 10 position of the benzocycloheptathiophene nucleus.

The compounds of formula I may exist either in free base or acid addition salt forms. Acid addition salt forms may be produced from free base forms and vice versa in manner known per se. Examples of suitable reagents for acid addition salt formation are inorganic acids, e.g. hydrochloric acid or sulphuric acid, and organic acids, e.g. fumaric acid or maleic acid.

The processes (a), (b), (c), and (d) of the invention may be effected as follows:

a. The reduction of the keto group is conveniently effected with a complex borohydride, for example sodium borohydride, and in an inert organic solvent (suspension agent), e.g. a lower alkanol such as ethanol.

It is generally convenient to effect the reduction at a moderate temperature, e.g. room temperature.

b. In accordance with a process for the production of oximes of formula Ib a compound of formula II is conveniently reacted with an acid addition salt form of hydroxylamine, e.g. with hydroxylamine hydrochloride.

The reaction may, for example, be effected in an inert solvent, e.g. an alkanol such as ethanol, or in water. When an acid addition salt form of hydroxylamine is used, then the resulting compond of formula Ib precipitates out from the reaction mixture in acid addition salt form.

The reaction temperature may range between room temperature and reflux temperature. The reaction time is dependent on the reaction temperature.

c. The use of selenium dioxide has been found to be specially convenient for the oxidation of a compound of formula II to a compound of formula Ic.

This oxidation may, for example, be effected by adding an oxidizing agent such as selenium dioxide to a solution of a compound of formula II in an inert organic solvent, preferably glacial acetic acid.

The reaction temperature may vary between room and reflux temperature.

The oxidation proceeds smoothly and, when effected at reflux temperature, is completed within about half an hour.

d. The reaction of a compound of formula III with a compound of formula IV may, for example, be effected in an inert organic solvent and preferably in the presence of a condensation agent, e.g. an alkali metal carbonate such as sodium or potassium carbonate. It is advantageous to use a strong polar solvent such as hexamethylphosphoric acid triamide, dimethyl sulphoxide or dimethyl formamide.

The reaction temperature is preferably kept low, between room temperature and approximately 60°C.

Insofar as the production of the starting materials is not particularly described, these are known or may be produced in accordance with known processes, or in a manner analogous to the processes described herein or to known processes.

The compounds of formula I are useful because they possess pharmacological activity in animals. In particular, the 10 hydroxy, the 9 oxime and the 10 keto compounds of formula I, that is, the compounds wherein A is methylene and B is hydroxymethylene, A is hydroxyamino and B is methylene or A is methylene and B is carbonyl, are useful as specific histaminolytics as indicated by standard tests, e.g. in the histamine toxicity test in guinea pigs, where a significant histaminolytic effect is observed at a dosage of from about 0.01 to 10 mg/kg animal body weight, and in the serotonin toxicity test and the acetylcholine toxicity test in guinea pigs, where no significant antiserotonin, or as the case may be, anticholinergic, effect is observed at the same dosage.

The 9 hydroxy, the 10 oxime, the 9 keto and the 9,10 diketo compounds of formula I, that is, the compounds wherein A is hydroxymethylene and B is methylene, A is methylene and B is hydroxyiminomethylene, A is carbonyl and B is methylene or each of A and B is carbonyl, are useful as antaminics, i.e. they are useful in antagonizing the effects of each of the biogenic amines histamine, serotonin and acetylcholine, as indicated by standard tests, e.g. in the abovementioned toxicity tests in guinea pigs, wherein a significant effect in all three tests is observed at a dosage of from about 1 to 10 mg/kg animal body weight.

The compounds of claim 1 wherein either one of A and B is hydroxymethylene or hydroxyiminomethylene and the other is methylene are of special interest. The compounds wherein A is methylene and B is carbonyl or where A and B are both carbonyls are also of interest. The compounds wherein $R_1$ is hydrogen or $R_2$ is alkyl of 1 to 4 carbon atoms, benzyl or chloro substituted benzyl are also interesting.

For use of the compounds as specific histaminolytics, or, as the case may be, as antaminics, e.g. in the treatment of allergic conditions of various origins, the dose to be administered will vary depending on the compound employed, mode of administration and treatment desired. However, in general, satisfactory results are obtained when administered at a daily dosage of from about 0.01 to 10 mg/kg animal body weight, parenterally or orally, preferably given in divided doses two or three times daily or in sustained release form. For the larger mammals, the total daily dosage is in the range of from about 0.5 to 200 mg, and dosage forms suitable for oral administration contain from about 0.15 to 100 mg of the compound administered with a solid or liquid pharmaceutical carrier or diluent.

The compounds of formula I may be administered in pharmaceutically acceptable acid addition salt form. Such acid addition salt forms possess the same order of activity as the free base forms. Suitable pharmaceutical acid addition salt forms include mineral acid addition salts such as the hydrochloride or sulphate, and organic acid addition salts such as the fumarate or maleate.

The compounds in free base or pharmaceutically acceptable acid addition salt form may be employed on their own, or as a pharmaceutical composition, in association with conventional pharmaceutical carriers or diluents. Suitable forms of composition for oral administration include a tablet and a capsule.

Examples of doses in relation to specific compounds, at which doses specific histaminolytic, or as the case may be, antaminic, activity is observed, are set out below, viz:

A. Specific histaminolytic activity i. 4-(1-benzyl-4-piperidylidene)-4H-benzo[4,5]-cyclohepta[1,2-b]thiophen-10(9H)-one . . . between 0.1 and 10 mg/kg animal body weight, ii. 9,10-dihydro-9-hydroxyimino-4-(1-methyl-4-piperidylidene)-4H-benzo[4,5]cyclohepta[1,2-b]thiophene . . . between 0.01 and 1 mg/kg animal body weight, and iii. 9,10-dihydro-4-(1-methyl-4-piperidylidene)-4H-benzo[4,5]cyclohepta[1,2-b]thiophen-10-ol . . . between 0.01 and 0.1 mg/kg animal body weight.

B. Antaminic activity i. 4-(1-methyl-4-piperidylidene)-4H-benzo[4,5]-cyclohepta[1,2-b]thiophene-9,10-dione . . . between 1 and 10 mg/kg animal body weight, ii. 4-(1-ethyl-4-piperidylidene)-9,10-dihydro-4H-benzo[4,5]cyclohepta[1,2-b]thiophen-9-ol . . . between 1 and 10 mg/kg animal body weight and iii. 9,10-dihydro-4-(1-methyl-4-piperidylidene)-4H-benzo[4,5]cyclohepta[1,2-b]thiophen-9-ol . . . between 1 and 10 mg/kg animal body weight.

In the following non-limitative Examples all temperatures are indicated in degrees Centigrade and are uncorrected.

EXAMPLE 1:
9,10-Dihydro-4-(1-methyl-4-piperidylidene)-4H-benzo[4,5]cyclohepta[1,2-b]thiophen-9-ol 48.5 g of 4-(1-methyl-4-piperidylidene)-4H-benzo[4,5]cyclohepta[1,2-b]thiophen-9(10H)-one base are dissolved in 1000 cc of 95 % ethanol, and 6 g of sodium borohydride are added at 20°. After stirring at 20° for 3 hours the solution is concentrated. 400 cc of water are added to the evaporation residue, this is rendered alkaline with concentrated caustic soda solution, and the base is extracted with 1000 cc of chloroform. The chloroform solution is concentrated and the evaporation residue is recrystallized from absolute ethanol. The pure 9,10-dihydro-4-(1-methyl-4-piperidylidene)-4H-benzo[4,5]cyclohepta[1,2-b]thiophen-9-ol base, having a M.P. of 244°–247°, is obtained in this manner. Microanalysis agrees with the formula $C_{19}H_{21}NOS$. The structure was ascertained from the infrared, ultraviolet, nuclear magnetic resonance and mass spectrograph spectra.

EXAMPLE 2:
4-(1-Ethyl-4-piperidylidene)-9,10-dihydro-4H-benzo[4,5]cyclohepta[1,2-b]thiophen-9-ol The process is effected as described in Example 1, except that the 4-(1-ethyl-4-piperidylidene)-4H-benzo[4,5]cyclohepta[1,2-b]thiophen-9(10H)-one base is used in place of the 4-(1-methyl-4-piperidylidene)-4H-benzo[4,5]cyclohepta[1,2-b]thiophen-9(10H)-one base. The product 4-(1-ethyl-4-piperidylidene)-9,10-dihydro-4H-benzo[4,5]cyclohepta[1,2-b]thiophen-9-ol is isolated as base. M.P. 200°–214° (crystallization from absolute ethanol).

EXAMPLE 3:
9,10-Dihydro-4-(1-methyl-4-piperidylidene)-4H-benzo[4,5]cyclohepta[1,2-b]thiophen-10-ol 25 g of 4-(1-methyl-4-piperidylidene)-4H-benzo[4,5]cyclohepta[1,2-b]thiophen-10(9H)-one base are suspended in 500 cc of 95 % ethanol, and 3.06 g of sodium borohydride are added at 20°. After stirring at room temperature for 40 hours the reaction mixture is concentrated. 500 cc of water are added to the evaporation residue, this is made alkaline with concentrated caustic soda solution, and the free base is extracted with 2500 cc of chloroform. The chloroform solution is concentrated, and the evaporation residue is recrystallized from toluene. The pure 9,10-dihydro-4-(1-methyl-4-piperidylidene)-4H-benzo[4,5]cyclohepta[1,2-b]thiophen-10-ol base, having a M.P. of 236°–241°, is obtained in this manner. Microanalysis agrees with the formula $C_{19}H_{21}NOS$. The structure was ascertained from the infrared, ultraviolet, nuclear magnetic resonance and mass spectrograph spectra.

EXAMPLE 4:
9,10-Dihydro-9-hydroxyimino-4-(1-methyl-4-piperidylidene)-4H-benzo[4,5]cyclohepta[1,2-b]thiophene A mixture of 13.5 g of hydroxylamine hydrochloride, 200 cc of absolute ethanol and 20 g of 4-(1-methyl-4-piperidylidene)-4H-benzo[4,5]cyclohepta[1,2-b]thiophen-9(10H)-one base is boiled at reflux for 1 hour. The mixture is then cooled to 0°–5° and the precipitated crystalline material is filtered off. After recrystallization from methanol, pure 9,10-dihydro-9-hydroxyimino-4-(1-methyl-4-piperidylidene)-4H-benzo[4,5]cyclohepta[1,2-b]thiophene hydrochloride, having a decomposition point of 290°–300°, is obtained. Microanalysis agrees with the formula $C_{19}H_{20}N_2OS \cdot HCl$. The structure was ascertained from the infrared and nuclear magnetic resonance spectra.

EXAMPLE 5:
9,10-Dihydro-10-hydroxyimino-4-(1-methyl-4-piperidylidene)-4H-benzo[4,5]cyclohepta[1,2-b]thiophene A mixture of 15 g of 4-(1-methyl-4-piperidylidene)-4H-benzo[4,5]cyclohepta[1,2-b]thiophen-10(9H)-one base, 10.1 g of hydroxylamine hydrochloride and 120 cc of water is stirred at an internal temperature of 90° for 1 hour. The hot reaction solution is subsequently made alkaline with 3 N caustic soda solution, and the base which crystallizes is filtered off. The crude base is purified by dissolving the same in 25 cc of glacial acetic acid and 50 cc of water, filtering with a small amount of charcoal and pouring the filtrate into a solution of 80 cc of concentrated ammonia and 500 cc of water. The precipitated base is filtered off, washed with water and dried in a vacuum. The pure 9,10-dihydro-10-hydroxyimino-4-(1-methyl-4-piperidylidene)-4H-benzo[4,5]cyclohepta[1,2-b]thiophene base, having a M.P. of 239°–241° (decomp.), is obtained in this manner. Microanalysis agrees with the formula $C_{19}H_{20}N_2OS$. In accordance with the nuclear magnetic resonance spectrum the product is a mixture of isomers of the syn/anti oxime at a ratio of 6:4.

EXAMPLE 6:
4-(1-Methyl-4-piperidylidene)-4H-benzo[4,5]cyclohepta[1,2-b]thiophene-9,10-dione 50 g of 4-(1-methyl-4-piperidylidene)-4H-benzo[4,5]cyclohepta[1,2-b]thiophen-10(9H)-one base are dissolved in 500 cc of glacial acetic acid, and 19.7 g of selenium dioxide are subsequently added. The reaction mixture is subsequently boiled at reflux for half an hour, is then poured on 1300 g of ice, and the pH is adjusted to 10 with 850 cc of concentrated caustic soda solution at 20° while cooling. The free base is extracted with 700 cc of chloroform. The chloroform solution is concentrated, and the evaporation residue is recrystallized from chloroform/petroleum ether (1:2).

The pure 4-(1-methyl-4-piperidylidene)-4H-benzo[4,5]cyclohepta[1,2-b]thiophene-9,10-dione base, having a M.P. of 200°–201° (decomp.), is obtained in this manner. Microanalysis agrees with the formula $C_{19}H_{17}NO_2S$. The structure was ascertained from the infrared, ultraviolet, nuclear magnetic resonance and mass spectrograph spectra.

EXAMPLE 7:
4-(1-Benzyl-4-piperidylidene)-4H-benzo[4,5]cyclohepta[1,2-b]thiophen-10(9H)-one 11.6 g of 4-(4-piperidylidene)-4H-benzo[4,5]cyclohepta[1,2-b]thiophen-10(9H)-one base and 12.5 g of anhydrous soda are added to 120 cc of hexamethylphosphoric acid triamide, and 6 g of benzyl chloride are added at 25°. After stirring at room temperature for 18 hours, stirring is continued at 50° for 1 hour. The reaction mixture is subsequently diluted with 1000 cc of water, and the base is extracted with 500 cc of benzene. The benzene solution is concentrated and the residue is recrystallized from isopropanol. The pure 4-(1-benzyl-4-piperidylidene)-4H-benzo[4,5]cyclohepta[1,2-b]thiophen-10(9H)-one base, having a M.P. of 136°–138°, is obtained in this manner. Microanalysis agrees with the formula $C_{25}H_{23}NOS$.

In analogous manner to that described in the preceding Example, the compounds 6-methoxy-4-(1-benzyl-4-piperidylidene)-4H-benzo[4,5]cyclohepta[1,2-b]thiophen-10(9H)-one, 6-Bromo-4-(1-benzyl-4-piperidylidene)-4H-benzo[4,5]cyclohepta[1,2-b]thiophen-10(9H)-one and 7-chloro-4-(1-benzyl-4-piperidylidene)-4H-benzo[4,5]cyclohepta[1,2-b]thiophen-10(9H)-one may be produced starting from the appropriate starting materials.

EXAMPLE 8:
4-(1-p-Chlorobenzyl-4-piperidylidene)-4H-benzo[4,5]cyclohepta[1,2-b]thiophen-10(9H)-one 5.17 g of 4-(4-piperidylidene)-4H-benzo[4,5]cyclohepta[1,2-b]thiophen-10(9H)-one base and 5.56 g of anhydrous soda are added to 60 cc of hexamethylphosphoric acid triamide, and 3.38 g of p-chlorobenzyl chloride are added at 20°–25°. After stirring at room temperature for 18 hours the reaction mixture is diluted with 500 cc of water, and the base is extracted with 350 cc of benzene. The benzene solution is concentrated and the residue is dissolved in 30 cc of absolute ethanol. This solution is made weakly acid with hydrochloric acid in ethanol, and after allowing to stand over night, the hydrochloride which crystallizes is filtered off at 0°–5°. The crude hydrochloride is recrystallized from 85 % ethanol. The pure 4-(1-p-chlorobenzyl-4-piperidylidene)-4H-benzo[4,5]cyclohepta[1,2-b]thiophen-10(9H)-one hydrochloride, having a M.P. of 269°–273° (decomp.), is obtained in this manner. Microanalysis agrees with the formula $C_{25}H_{22}ClNOS \cdot HCl$.

In analogous manner to that described in the preceding Example, the compounds 4-(1-diphenylmethyl-4-piperidylidene)-4H-benzo[4,5]cyclohepta[1,2-b]thiophen-10(9H)-one, 4-[1-di-(p-bromophenyl)methyl-4-piperidylidene]-4H-benzo[4,5]cyclohepta[1,2-b]thiophen-10(9H)-one, 4-[1-di-(p-chlorophenyl)methyl-4-piperidylidene]-4H-benzo[4,5]cyclohepta[1,2-b]thiophen-10(9H)-one, and 4-[1-di-(p-fluorophenyl)methyl-4-piperidylidene]-4H-benzo[4,5]cyclohepta[1,2-b]thiophen-10(9H)-one may be produced starting from the appropriate starting materials.

What is claimed is:
1. A compound of the formula:

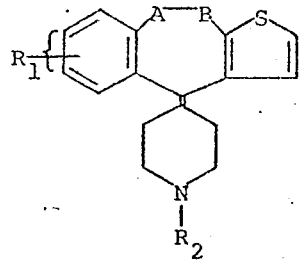

wherein
$R_1$ is hydrogen, chlorine, bromine or alkoxy of 1 to 4 carbon atoms and is in the 6 or 7 position of the benzocycloheptathiophene nucleus;

$R_2$ is alkyl of 1 to 4 carbon atoms; benzyl; fluoro, chloro or bromo substituted benzyl; diphenylmethyl; or fluoro, chloro or bromo substituted diphenylmethyl; and either one of A and B is hydroxymethylene or hydroxyiminomethylene and the other is methylene; or, each of A and B is carbonyl; or, when $R_2$ is benzyl; fluoro, chloro or bromo substituted benzyl; diphenylmethyl; or fluoro, chloro or bromo substituted diphenylmethyl; then one of A and B is carbonyl and the other is methylene;
in free base or pharmaceutically acceptable acid addition salt form.

2. A compound of claim 1, wherein A is hydroxymethylene and B is methylene, A is methylene and B is hydroxyiminomethylene, A is carbonyl and B is methylene, or each of A and B is carbonyl.

3. A compound of claim 1, wherein A is methylene and B is hydroxymethylene, A is hydroxyiminomethylene and B is methylene, or A is methylene and B is carbonyl.

4. A compound of claim 1, wherein either one of A and B is hydroxymethylene or hydroxyiminomethylene and the other is methylene.

5. A compound of claim 1, wherein A is methylene and B is carbonyl.

6. A compound of claim 1, wherein each of A and B is carbonyl.

7. A compound of claim 1, wherein $R_1$ is hydrogen.

8. A compound of claim 1, wherein $R_2$ is alkyl of 1 to 4 carbon atoms, benzyl, or chloro substituted benzyl.

9. The compound of claim 1, which is 9,10-dihydro-4-(1-methyl-4-piperidylidene)-4H-benzo[4,5]cyclohepta[1,2-b]thiophen-9-ol.

10. The compound of claim 1, which is 4-(1-ethyl-4-piperidylidene)-9,10-dihydro-4H-benzo[4,5]cyclohepta[1,2-b]thiophen-9-ol.

11. The compound of claim 1, which is 9,10-dihydro-4-(1-methyl-4-piperidylidene)-4H-benzo[4,5]cyclohepta[1,2-b]thiophen-10-ol.

12. The compound of claim 1, which is 9,10-dihydro-9-hydroxyimino-4-(1-methyl-4-piperidylidene)-4H-benzo[4,5]cyclohepta[1,2-b]thiophene 13. The compound of claim 1, which is 9,10-dihydro-10-hydroxyimino-4-(1-methyl-4-piperidylidene)-4H-benzo[4,5]cyclohepta[1,2-b]thiophene.

14. The compound of claim 1, which is 4-(1-methyl-4-piperidylidene)-4H-benzo[4,5]cyclohepta[1,2-b]thiophene-9,10-dione.

15. The compound of claim 1, which is 4-(1-benzyl-4-piperidylidene)-4H-benzo[4,5]cyclohepta[1,2-b]thiophen-10(9H)-one.

16. The compound of claim 1, which is 4-(1-p-chlorobenzyl-4-piperidylidene)-4H-benzo[4,5]cyclohepta[1,2-b]thiophen-10(9H)-one.

* * * * *